United States Patent
Olesen et al.

(10) Patent No.: US 6,615,305 B1
(45) Date of Patent: Sep. 2, 2003

(54) INTERRUPT PACING IN DATA TRANSFER UNIT

(75) Inventors: Morten Vested Olesen, Copenhagen O (DK); Steen Vase Kock, Copenhagen S (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/384,494

(22) Filed: Aug. 27, 1999

Related U.S. Application Data

(60) Provisional application No. 60/098,079, filed on Aug. 27, 1998.

(51) Int. Cl.[7] .............................................. G06F 13/24
(52) U.S. Cl. ....................................... 710/262; 710/266
(58) Field of Search ................................ 710/262, 260, 710/261, 263, 264, 265, 266, 267, 268, 269

(56) References Cited

U.S. PATENT DOCUMENTS

| | | | | |
|---|---|---|---|---|
| 5,659,758 A | * | 8/1997 | Gentry et al. | 710/260 |
| 5,708,814 A | * | 1/1998 | Short et al. | 710/260 |
| 5,913,071 A | * | 6/1999 | Macomber | 712/40 |
| 5,933,613 A | | 8/1999 | Tanaka et al. | 395/308 |
| 5,943,479 A | * | 8/1999 | Klein et al. | 709/212 |
| 6,012,121 A | * | 1/2000 | Govindaraju et al. | 370/396 |
| 6,189,066 B1 | * | 2/2001 | Lowe et al. | 710/260 |
| 6,189,067 B1 | * | 2/2001 | Lowe et al. | 710/260 |
| 6,192,440 B1 | * | 2/2001 | Lowe et al. | 710/260 |
| 6,345,345 B1 | * | 2/2002 | Yu et al. | 710/116 |
| 6,351,785 B1 | * | 2/2002 | Chen et al. | 710/260 |

* cited by examiner

Primary Examiner—Sumati Lefkowitz
Assistant Examiner—X. Chung-Trans
(74) Attorney, Agent, or Firm—Fish & Richardson P.C.

(57) ABSTRACT

An apparatus and method for controlling the number of interrupts a data transfer unit generates to a CPU is disclosed. A pacing unit is used to register attempted data transfers (events) from a data transfer unit to a CPU and compares this value to a user defined threshold limit. When the number of events reaches the threshold limit, an interrupt is generated to the CPU.

5 Claims, 3 Drawing Sheets

INTERRUPT PACING IN DATA TRANSFER UNIT

CROSS REFERENCE TO RELATED APPLICATIONS

This application claims the benefit of prior U.S. provisional application No. 60/098,079, filed Aug. 27, 1998.

FIELD OF THE INVENTION

This invention relates to data transfer and processing within a computer system.

BACKGROUND OF THE INVENTION

An exemplary data transfer unit 10 and CPU 20 are depicted in FIG. 1. The data transfer unit 10 transfers data as instructed by the CPU 20. When the data transfer unit has completed a data transfer (an event) the CPU is interrupted 30 to process the data. In a typical computer system, it is common for a CPU 20 to receive and process a huge number of interrupts. Due to the time and resources necessary to process an interrupt, frequent interrupts often result in reduced CPU 20 performance. It is therefore desirable to reduce the number of CPU interrupts necessary to transfer data within a system.

SUMMARY OF THE INVENTION

In general, in one aspect, the invention features a method for controlling (pacing) the number of interrupts generated by a data transfer unit to a CPU. Data transfers (events) from a data transfer unit are monitored and recorded before they reach the CPU. When the number of data transfers reaches a defined threshold value, an interrupt is generated to the CPU which allows it to acknowledge and process the data transfers prior to the interrupt.

Another implementation of the invention may include a timing method for generating interrupts in conjunction with the pacing method. The method includes defining a time value to specify the minimum or maximum amount of time between interrupts.

In general, in another aspect, the invention features an apparatus for controlling (pacing) the number of interrupts generated by a data transfer unit to a CPU. The apparatus includes a pacing counter which contains a control unit, a threshold register, event register, and comparator. The control unit monitors and counts events as they are generated by the data transfer unit and also receives the count of events already acknowledged by the CPU. The threshold register is set at a defined value, corresponding to the number of events at which an interrupt will be generated. The event register counts the number of events generated by the data transfer unit. The comparator compares the number of events generated with the defined threshold value, and when the number of generated events corresponds to the threshold value, it generates an interrupt to the CPU.

Other implementations may include the following advantages. A timing apparatus may be used in conjunction with the pacing apparatus. The timing apparatus may be set to specify an amount of time, including a minimum or maximum time, between interrupts. An OR gate may be used to accommodate both the pacing and timing apparatuses and prevent the transmission of simultaneous interrupts, separately generated by each apparatus.

A preset number of data transfers can be thus effected before a CPU is interrupted. The number of interrupts a CPU must process is thus limited, allowing for greater CPU efficiency and performance.

DESCRIPTION OF THE PREFERRED EMBODIMENTS

Figure 1:
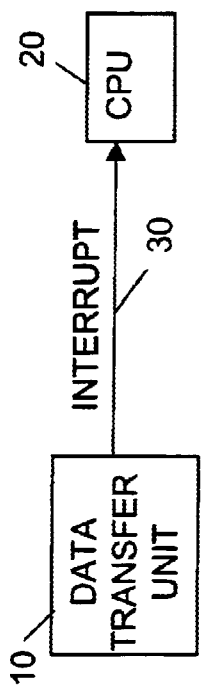
FIG. 1 is a diagram of a computer system.
Figure 2:
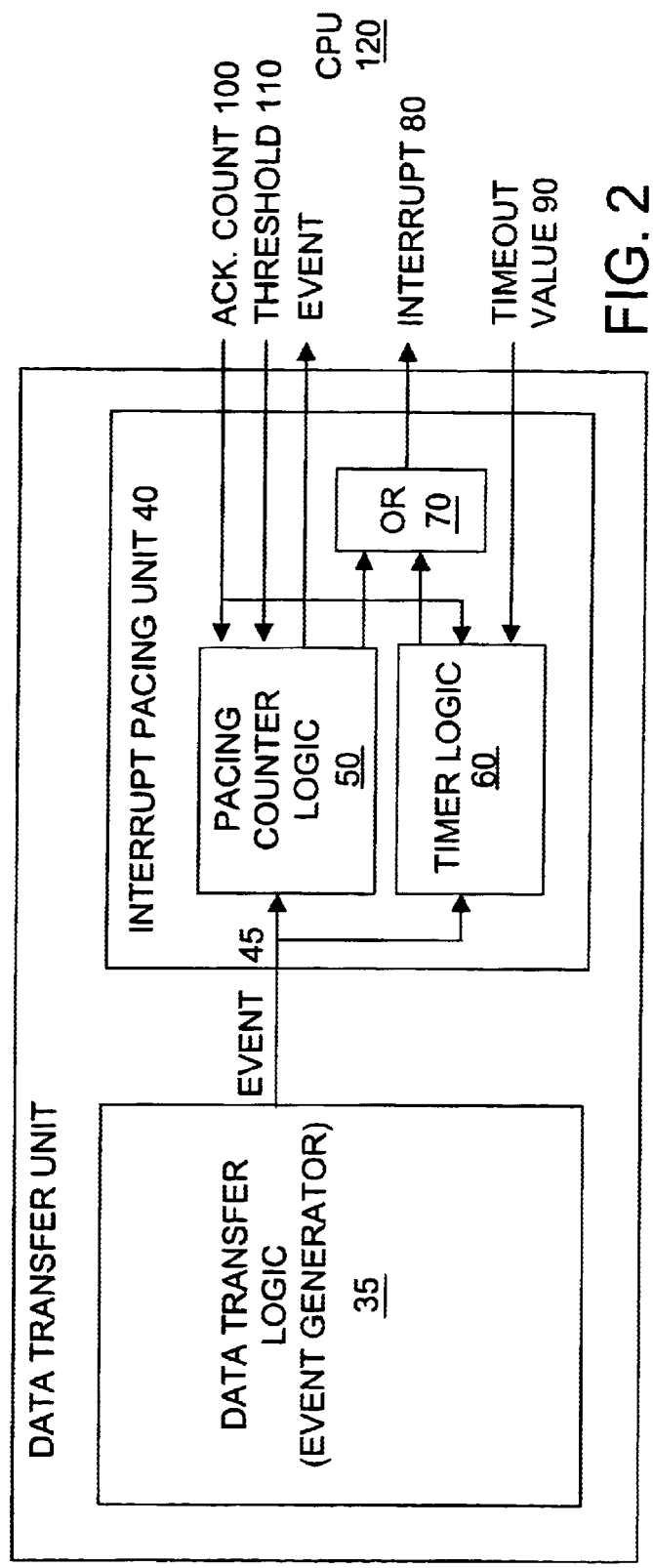
FIG. 2 is a diagram of a data transfer unit operating with an interrupt pacing unit.

Referring to FIG. 2, a pacing unit 40 is used to intercept events (data transfers) from a data transfer unit 35. The pacing unit contains a pacing counter 50 that is increased when an event is intercepted. When the value of the pacing counter reaches a selected threshold limit, n, an interrupt 80 is sent from the pacing unit to the CPU 120. After the CPU 120 accepts and acknowledges the n events, the pacing unit 40 decreases the pacing counter 50 by n. If the number of acknowledged interrupt events is greater than the pacing counter value a special error interrupt may be generated. If the value of the pacing counter is equal to or higher than the threshold value after the CPU 120 has acknowledged a number of events another interrupt may be immediately generated.

Figure 3:
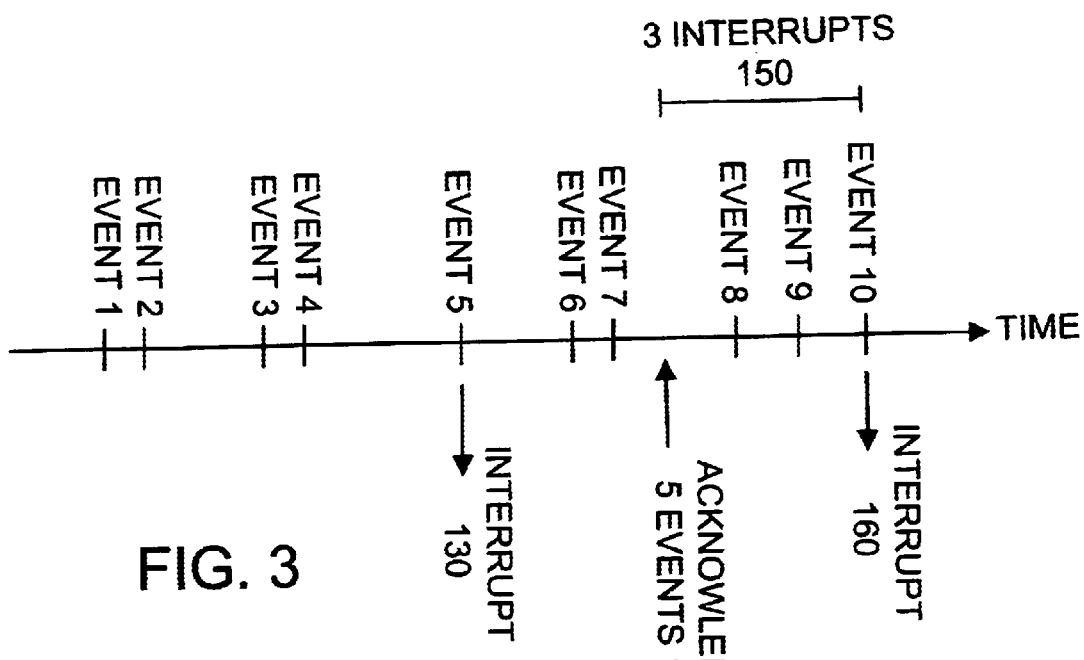
FIG. 3 is an event timeline.

FIG. 3 depicts an example of this method, where the threshold value is five. The CPU is interrupted 130 after five events are received from the data transfer unit, and before it can process and acknowledge the events, two additional events occur. The CPU acknowledges the five events at 140. Only three more events 150 then need to occur before the CPU is interrupted again at 160, to handle the next five events.

Figure 4:
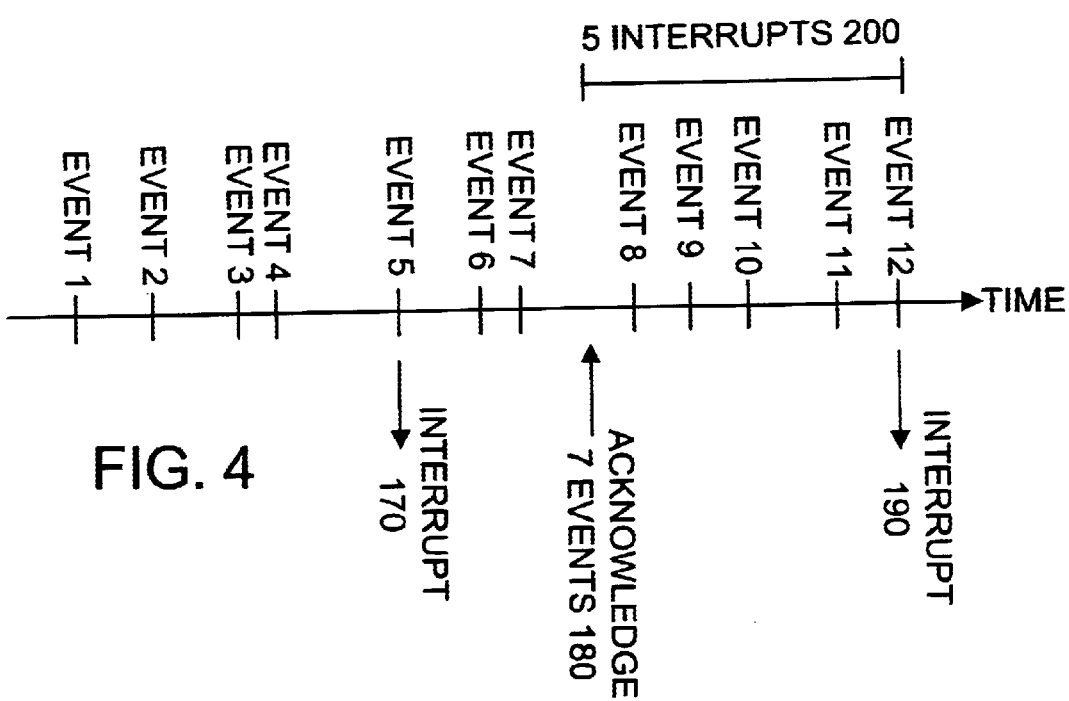
FIG. 4 is an event timeline.

FIG. 4 depicts a second example where the threshold is set to five. The CPU is interrupted at 170 after five events have been received from the data transfer unit, and as before, before the CPU processes and acknowledges the first five events, two additional events have occurred. Here, the CPU receives all the events available from the pacing counter, and acknowledges at 180 the seven events it has processed. The pacing unit generates the next interrupt at 190 when five more interrupt events 200 have occurred.

Referring again to FIG. 2, the pacing counter logic 50 registers events that are transferred from the data transfer unit 35 to the CPU 120. A threshold value 110, as determined by a user is conveyed from the CPU 120 to the pacing counter logic 50. The threshold value 110 represents the number of data transfers (events) the pacing unit 40 receives before an interrupt is generated. In addition, an acknowledgement count 100 is generated by the CPU 120 to the pacing counter logic 50. The acknowledgment count 100 represents the number of events the CPU 120 has received and processed. By comparing the number of events generated by the data transfer unit and the threshold value 110, the pacing counter logic 50 is able to generate an interrupt to the CPU at the appropriate time, as illustrated in the examples of FIGS. 3 and 4.

Alternatively, the pacing method can be combined with a timer method of generating interrupts to a CPU. Referring to FIG. 2, a timer logic 60 is used within the interrupt pacing unit 40. The timer logic 60 receives a timeout value 90 from the CPU 120 as set by a user. The timeout value can be either a minimum or maximum time value between generated interrupts. For example, the interrupt pacing unit 40 may be programmed to generate an interrupt every X events or every Y minutes, whichever comes first. Alternatively, the pacing unit 40 can be programmed to generate an interrupt only after a minimum amount of time has passed. For example, if the timer logic 60 is set for a y minute minimum time, the pacing unit 40 will not generate an interrupt until y minutes have elapsed since the last interrupt or x events, whichever comes later. The criteria for selecting these parameters will depend upon the flow of data traffic from the data transfer unit 35 to the CPU 120 and the processing capacity of the CPU 120 itself. In order to accommodate both a pacing counter logic 50 and a timer logic 60, an OR gate 70 is used to enable the interrupt to come from either the pacing logic or the timer logic, and the interrupt signal is fed back to both logics, to reset the timing counter and to disable the pacing counter until an acknowledge signal from the CPU is received.

Figure 5:
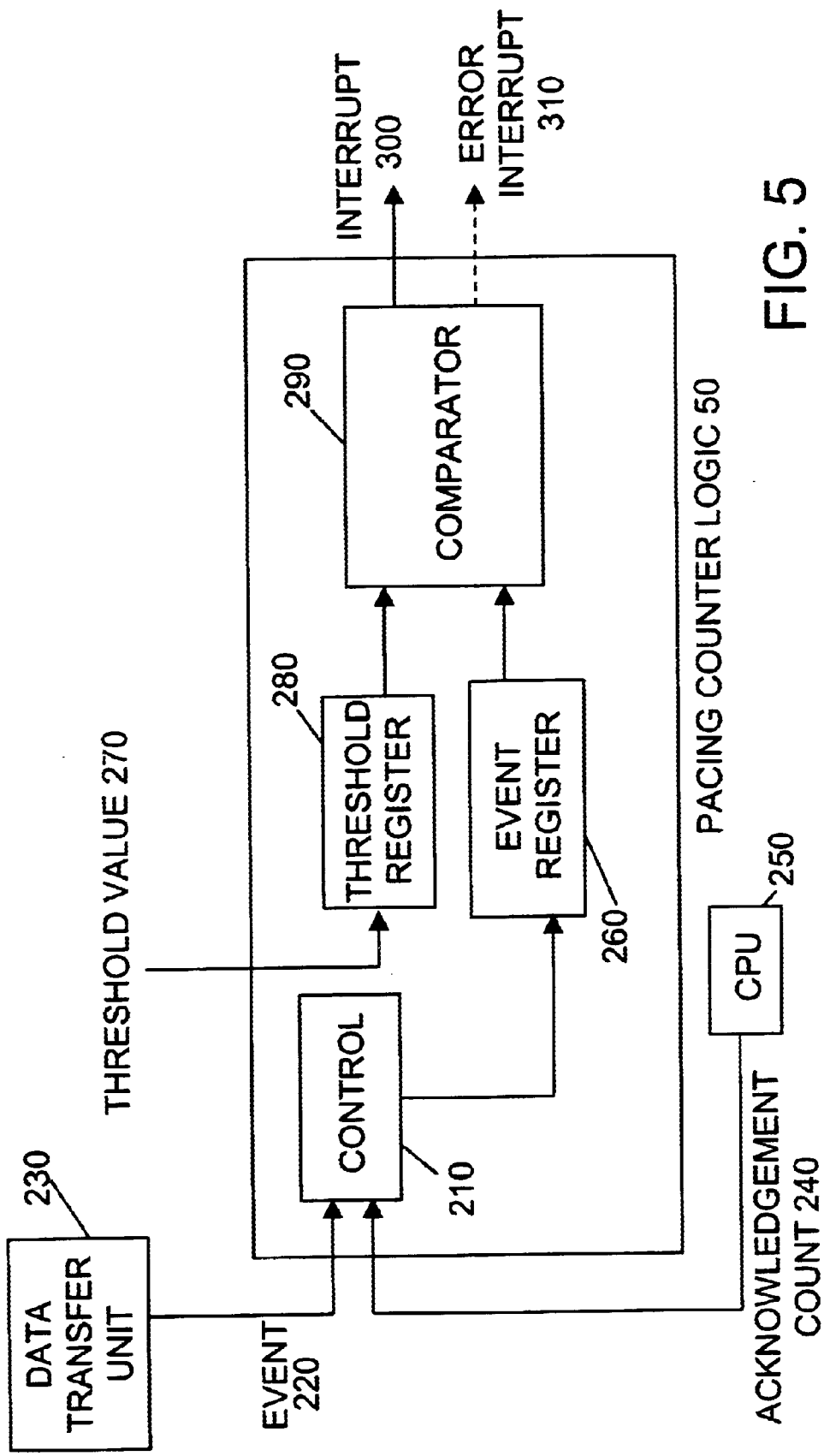
FIG. 5 is a diagram of a pacing counter logic.

Referring to FIG. 5, a pacing counter logic 50 contains a control unit 210 which receives events 220 from the data transfer unit 230 and an acknowledgement count 240 from the CPU 250. The event 220 and acknowledgement count 240 data are transferred to an event register 260 which tracks both parameters. The value of the event register is increased with every event that is generated by the data transfer unit 230. A threshold register 280 receives a threshold value 270 as set by a user. Both the threshold register 280 and the event register 260 transfer their respective data values to a comparator 290. The comparator 290 compares the threshold value 270 with the number of events received by the event register. If the number of received events 220 is equal to the threshold limit 270, an interrupt 300 is generated.

Thereafter, if the number of acknowledged events 240 is greater than the threshold limit 270, (in the case of FIG. 3) or the number of registered events (in the case of FIG. 4) a special error interrupt 310 is generated. When the CPU acknowledges n events, and no error interrupt is generated, the event register 260 is decreased by n. Subsequent events generated by the data transfer unit 230 increase the event register 260 again, until the threshold limit 270 is reached and another interrupt 300 is generated.

While the invention has been particularly shown and described with reference to a preferred embodiment and alternate embodiments thereof, it will be understood by persons skilled in the relevant art that various changes in form and details can be made therein without departing from the spirit and scope of the invention.

What is claimed is:

1. An apparatus for limiting interrupts from a data transfer unit to a central processing unit (CPU) comprising:

said data transfer unit generating interrupts at the occurrence of data transfer events, a pacing counter logic for intercepting said generated interrupts, counting the number of generated interrupts, and decreasing the counted number of interrupts in accordance with a number of events acknowledged by the CPU;

said pacing counter logic causing an interrupt to the central processing unit if a certain threshold limit of the number of generated interrupts is exceeded, said pacing counter logic generating a special error interrupt if the number of acknowledged interrupt events is greater than the threshold limit;

a timer logic, operating with said pacing counter logic, for setting a minimum or maximum time between generated interrupts, wherein an interrupt to the central processing unit is caused based on one of either the counter logic or the timer logic.

2. The apparatus according to claim 1 wherein said pacing counter logic comprises:

a threshold register for recording the number of events to occur before an interrupt is generated;

a control unit for receiving an event generated by a data transfer unit to a CPU;

an event register responsive to the control unit for counting the number of events a data transfer unit generates to a CPU; and a comparator responsive to the threshold register and the event register for sending an interrupt signal to a CPU.

3. A method of controlling the number of interrupts to a central processing unit (CPU), the method comprising:

intercepting interrupts representing interrupt events from a data transfer unit to a CPU;

selecting an interrupt threshold value;

counting the number of intercepted interrupts in a counter;

generating an interrupt to the CPU when the number of interrupt events equals or exceeds said threshold value;

receiving from the CPU an acknowledged event count;

decreasing the counter by a CPU acknowledged event count;

using a timing unit to specify an amount of time between interrupts, wherein an interrupt is generated based on one of either the counter or timing unit; and generating a special error interrupt if the number of acknowledged interrupt events is greater than the threshold limit.

4. An apparatus for controlling the number of interrupts a data transfer unit generates to a CPU, comprising:

a pacing means for intercepting said interrupts and counting the number of interrupt events;

a counter means for counting the number of interrupt events and generating an interrupt if a certain threshold limit is exceeded, and for decreasing the counted number based on a number of events acknowledged by the CPU, and for generating a special error interrupt if the number of acknowledged interrupt events is greater than the threshold limit;

a means for sending an interrupt signal to a CPU; and a timing means for specifying an amount of tine between interrupts, wherein an interrupt is generated based on one of either the counter means or the timing means.

5. The apparatus of claim 4 wherein said pacing counter means comprises:

a threshold register means for recording the number of events to occur before an interrupt is generated;

an event register means for counting the number of events a data transfer unit sends to a CPU; and for decreasing the counted number based on events acknowledged by the CPU;

a control means for receiving an event generated by a data transfer unit en route to a CPU; and a means for comparing the number of events with a threshold value in order to generate an interrupt.

* * * * *